United States Patent
Udagawa et al.

[11] Patent Number: 5,154,529
[45] Date of Patent: Oct. 13, 1992

[54] POSITIONING PIN FOR A GASKET

[75] Inventors: Tsunekazu Udagawa, Ichikawa; Susumu Inamura, Tokyo, both of Japan

[73] Assignee: Ishikawa Gasket Co., Ltd., Tokyo, Japan

[21] Appl. No.: 681,700

[22] Filed: Apr. 8, 1991

Related U.S. Application Data

[63] Continuation-in-part of Ser. No. 645,978, Jan. 24, 1991, Pat. No. 5,096,325.

[51] Int. Cl.$^5$ .............................................. B25G 3/00
[52] U.S. Cl. ...................................... 403/13; 403/288; 277/235 B
[58] Field of Search .................... 403/13, 14, 288; 277/235 B, 189, 11, 166

[56] References Cited

U.S. PATENT DOCUMENTS

| 2,639,832 | 5/1953 | Bergstrom | 403/288 |
| 2,745,521 | 5/1956 | White | 277/166 X |
| 4,524,979 | 6/1985 | Bauder | 277/189 |
| 4,757,560 | 7/1988 | Grimstad | 277/166 X |
| 4,776,601 | 10/1988 | Yamada | 277/166 X |

Primary Examiner—Andrew V. Kundrat
Attorney, Agent, or Firm—Kanesaka and Takeuchi

[57] ABSTRACT

A positioning pin of the invention is attached to an engine part for installing a gasket thereon. The positioning pin includes a body having a projection extending outwardly from the engine part. The projection includes at least one large diameter portion, and a small diameter portion about the body. When the gasket is accidentally moved on the engine part to slip out of the positioning pin, the gasket engages the small diameter portion or is blocked by the large diameter portion to prevent accidental disengagement of the gasket from the engine part.

7 Claims, 1 Drawing Sheet

POSITIONING PIN FOR A GASKET

CROSS REFERENCE TO RELATED APPLICATION

This is a continuation in part application of Ser. No. 645,978, filed on Jan. 24, 1991, now U.S. Pat. No. 5,096,325.

BACKGROUND OF THE INVENTION AND RELATED ART STATEMENT

The present invention relates to a positioning pin or dowel attached to an engine block of an internal combustion engine for setting a location of a gasket.

When engine parts are assembled with a gasket, a lower engine part is placed on a floor or a platform. Since the lower engine part is provided with dowels for setting a location of the gasket, the gasket is placed on the lower engine part so that the dowels are located in dowel holes of the gasket. Then, an upper engine part is placed above the gasket, and the two engine parts are tightened together by bolts.

In order to easily assemble the gasket on the lower engine part, the diameter or size of the dowel hole of the gasket is slightly larger than the diameter of the dowel. Therefore, in case the lower engine part with the gasket is shaken, the gasket may disengage from the lower engine part.

Especially, in a V engine, gasket attaching surfaces of the lower engine part incline downwardly. Therefore, even if gaskets are installed on the gasket attaching surfaces of the lower engine part, the gaskets are liable to disengage from the lower engine part.

In an automatic assembly line of engines, engines are continuously or consecutively moved. When the upper engine part is assembled on the lower engine part with the gasket, in some cases, the engine parts are stopped for a while for assembly.

In the V engine, in case the lower engine part with the gaskets is consecutively moved and stopped, the gaskets may fall from the lower engine part. In the automatic assembly line, it is troublesome to check the gasket in each engine, and install a gasket in case no gasket is placed on the lower engine part.

In a positioning pin or dowel, there has not been made any device for preventing a gasket from disengaging from an engine part.

Accordingly, one object of the invention is to provide a positioning pin for preventing accidental disengagement of a gasket from an engine part as well as exactly setting a location of the gasket.

Another object of the invention is to provide a positioning pin as stated above, to which a gasket can be easily installed.

A further object of the invention is to provide a positioning pin as stated above, which can be easily and economically manufactured.

Further objects and advantages of the invention will be apparent from the following description of the invention.

SUMMARY OF THE INVENTION

A positioning pin or dowel of the present invention is attached to an engine part, i.e. engine block, of an internal combustion engine for setting a location of a gasket. Generally, at least two positioning pins are attached to the engine part.

The positioning pin of the invention includes a body having a projection extending outwardly from the engine part. The height of the projection is at least equal to the thickness of the gasket to be installed.

The projection of the body is provided with at least one large diameter portion and at least one small diameter portion to be arranged along the longitudinal direction of the body. When the gasket is installed on the engine part, the small diameter portion is at least located inside the positioning hole of the gasket. Accordingly, when the gasket is moved on the engine part, a portion of the gasket around the positioning hole is blocked by the large diameter portion to prevent accidental disengagement of the gasket from the engine part.

In case one large diameter portion and one small diameter portion are provided on the projection, the large diameter portion has a diameter substantially equal to or slightly smaller than that of a position setting hole formed on one of plates of a gasket. When the gasket is installed on the engine block, the large diameter portion is situated in the position setting hole of the gasket to precisely locate the gasket on the engine block.

The gasket has a blocking plate situated under the large diameter portion, or in the small diameter portion. Accordingly, the gasket does not disengage from the positioning pin.

In case two large diameter portions, i.e. upper and lower large diameter portions, and one small diameter portion are provided on the projection, the small diameter portion is situated between the upper and lower large diameter portions. The upper large diameter portion extends outwardly beyond the gasket for setting a position of a engine part situated above the gasket.

The lower large diameter portion has the diameter substantially equal to that of the position setting hole formed on one of the plates of the gasket. When the position setting hole of the plate engages the lower large diameter portion, the gasket is precisely positioned.

When a gasket is installed on the engine part, the positioning holes of the gasket engage the positioning pins on the engine part. When the gasket thus installed abuts against the engine part, the gasket is located in a proper position. When the gasket is accidentally moved outwardly, one of edges of the plates of the gasket around the positioning holes engages the small diameter portion or is blocked by the upper large diameter portion to prevent accidental disengagement of the gasket from the engine part.

Especially, in a V type engine, the gasket attaching portion of the engine inclines downwardly. Therefore, when the gasket is slightly moved, the gasket is liable to disengage from the positioning pins. In the present invention, the edges around the positioning holes of the gasket engage the small diameter portions or are blocked by the large diameter portions of the positioning pins when the gasket is moved on the engine part. Therefore, the gasket is securely retained on the engine part.

Since a steel laminate gasket is formed of a plurality of thin steel plates, the positioning pin of the present invention is especially useful for retaining the steel laminate gasket on the engine part.

DETAILED DESCRIPTION OF PREFERRED EMBODIMENTS

Figure 1:
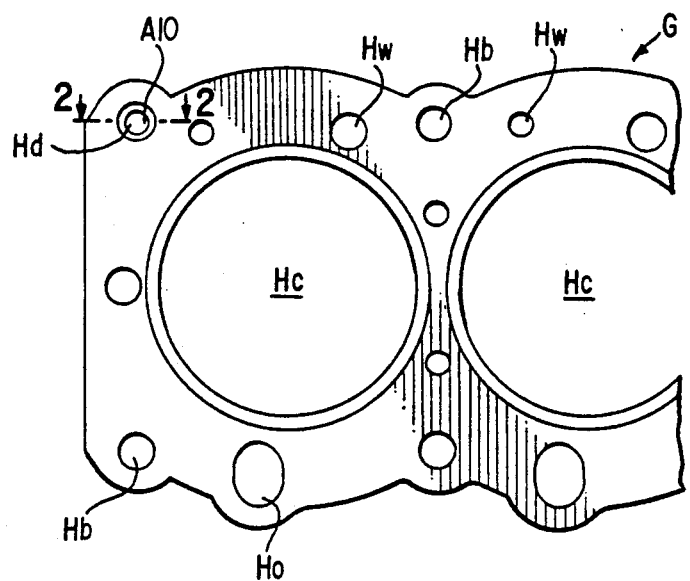
FIG. 1 is a plan view of a part of a gasket installed on a cylinder block.

FIG. 1 shows a steel laminate gasket G installed on a cylinder block X with positioning pins A or dowels of the present invention. The gasket G is a cylinder head gasket, and includes a plurality of cylinder bores Hc, water holes Hw, oil holes Ho, and bolt holes Hb and push rod holes Hp, as in the conventional gasket.

The gasket G includes two positioning holes Hd (one is shown in FIG. 1). When the gasket G is installed on the cylinder block X, the positioning pins A attached to the cylinder block X are located in the positioning holes Hd of the gasket G.

In the gasket G, one of the bolt holes Hb is made large to constitute the positioning hole Hd, in which the positioning pin A is located when the gasket G is installed on the cylinder block X. In this embodiment, the positioning pins A extend beyond the gasket G, and the positioning pins A also determine the position of the cylinder head (not shown) to be placed above the gasket G. When an engine is assembled, bolts (not shown) pass through the positioning pins A and connect a cylinder head and the cylinder block X.

Figure 2:
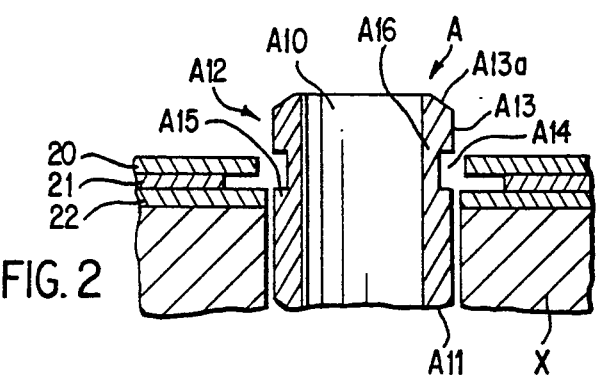
FIG. 2 is an enlarged section view taken along line 2—2 in FIG. 1, wherein a first embodiment of a positioning pin of the invention is shown.

As shown in FIGS. 1 and 2, the positioning pin A has a cylindrical hollow shape and includes a hole A10 therein for allowing a bolt to pass therethrough. The positioning pin A is formed of a lower part A11 and an upper part or projection A12.

When the positioning pin A is installed on the cylinder block X, the lower part A11 is attached to or fixed inside the cylinder block X, and the upper part A12 projects outwardly from an upper surface of the cylinder block X.

The upper part A12 includes an upper large diameter portion A13 with a tapered edge A13a, a groove A14, and a lower large diameter portion A15. The lower large diameter portion A15 is located under the groove A14 and above the lower part A11, i.e. above an upper surface of the cylinder block X. A small diameter portion A16 is formed inside the groove A14.

The tapered edge A13a is formed at an upper end of the positioning pin A, so that the positioning hole of the gasket can be easily placed over the positioning pin A. Since the positioning pin A includes the groove A14, only when the gasket G is aligned precisely, the gasket G can be installed on the engine block. Namely, when the gasket G is moved diagonally, the gasket G engages the groove A14 and is prevented from disengagement from the positioning pin A.

The lower large diameter portion A15 has a diameter substantially the same as a position setting hole of the gasket G. Therefore, when the gasket G engages the lower large diameter portion A15, the gasket G is properly positioned on the cylinder block X.

In the embodiment as shown in FIGS. 1 and 2, the gasket G is a steel laminate gasket including an upper plate 20, a middle plate 21 and a lower plate 22. The size of a hole in the lower plate 22 is substantially the same as the lower large diameter portion A15 of the positioning pin A. Therefore, when the hole of the lower plate 22 engages the lower large diameter portion A15 of the positioning pin A, the gasket G is located in a proper position.

Also, the width of the groove A14 is made larger than the thicknesses of the middle and lower plates 21, 22. Accordingly, when the gasket G is moved to slip out of the positioning pin A, one of the plates 21, 22, in particular the lower plate 22 in FIG. 2, engages the groove A14 to thereby prevent disengagement of the gasket G from the positioning pin A.

Figure 3:
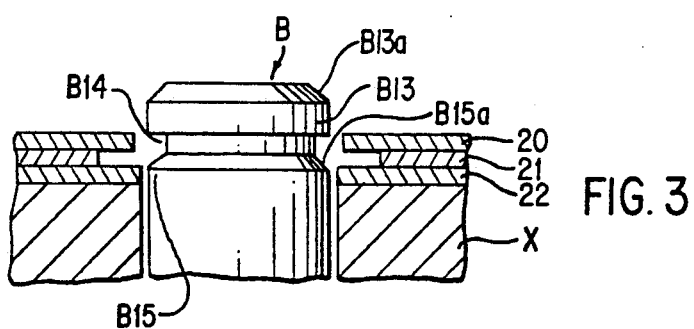
FIGS. 3 and 4 are side views of parts of second and third embodiments of the positioning pins of the invention.

FIG. 3 shows a second embodiment B of a positioning pin of the invention. The positioning pin B includes an upper large diameter portion B13 with a tapered edge B13a, a groove B14, and a lower large diameter portion B15, as in positioning pin A. In the positioning pin B, however, the lower large diameter portion B15 includes a tapered edge B15a adjacent the groove B14. The rest of the structure of the positioning pin B is the same as the positioning pin A.

In the positioning pin B, since the lower large diameter portion B15 is provided with the tapered edge B15a, when the gasket G is installed on the cylinder block X, the gasket G can be smoothly placed on the cylinder block X. When the gasket G is moved, however, the edge of the plate is held in the groove B14, i.e. blocked by the upper large diameter portion B13. Accordingly, the positioning pin B can hold the gasket G when the gasket G is moved to slip out of the engine block X.

Figure 4:
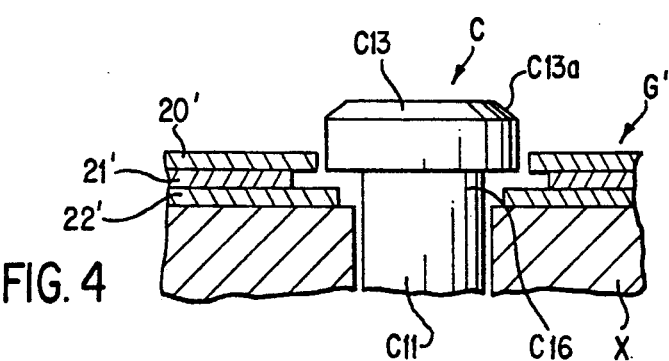

FIG. 4 shows a third embodiment C of a positioning pin of the invention. The positioning pin C includes a large diameter portion C13 with a tapered edge C13a, a small diameter portion C16, and a lower part C11 fixed to the cylinder block X.

In the positioning pin C, the large diameter portion C11 has the diameter substantially the same as a position setting hole formed on an upper plate 20' of the gasket C'. Therefore, when the gasket C' engages the large diameter portion C13, the gasket G' is properly positioned on the cylinder block X.

In this embodiment, the gasket G' further includes a middle plate 21', and a lower plate 22' which is made of a flexible material and extends under the large diameter portion C13 to constitute a blocking plate. Even if the gasket G' is moved, since the lower plate 22' is located under the large diameter portion C13, the gasket G' does not disengage from the positioning pin C. Incidentally, the positioning pin C can pass through the lower plate 22' by strongly pushing the gasket G' when installed.

In accordance with the present invention, a positioning pin attached to the engine part is provided with at least one large diameter portion at an upper portion thereof, and a small diameter portion. When the gasket accidentally moves on the engine part, one of the plates of the gasket engages the small diameter portion, or is blocked by the large diameter portion. Accordingly, accidental disengagement of the gasket form the engine part is securely prevented.

While the invention has been explained with reference to the specific embodiments of the invention, the explanation is illustrative, and the invention is limited only by the appended claims.

What is claimed is:

1. A positioning pin adapted to be attached to an engine part for installing a gasket on the engine part, said gasket having a positioning hole engaging the positioning pin, said positioning pin comprising,
 a body attached to the engine part and having a projection extending outwardly from the engine part, said projection having a height at least equal to a thickness of the gasket to be installed, and an upper large diameter portion formed at a top of the projection, at least one small diameter portion situated under the upper large diameter portion, and a lower large diameter portion formed under the small diameter portion, said upper and lower large diameter portions and the small diameter portion being formed around the projection of the body to be arranged along the longitudinal direction of the body, said small diameter portion, when the gasket is installed on the engine part, being at least located inside the positioning hole of the gasket so that when the gasket is moved on the engine part, a portion of the gasket around the positioning hole is blocked by the large diameter portion to prevent accidental disengagement of the gasket from the engine part, said lower large diameter portion having a diameter substantially equal to that of a position setting hole of a plate of the gasket for setting the location of the gasket so that when the position setting hole of the plate engages the lower large diameter portion, the gasket is precisely positioned on the engine part.

2. A positioning pin according to claim 1, wherein said body includes a tapered edge at an upper portion thereof to facilitate engagement of the positioning hole of the gasket with the positioning pin.

3. A positioning pin according to claim 1, wherein said upper large diameter portion extends outwardly beyond the gasket for setting a position of an engine part situated above the basket.

4. A positioning pin according to claim 1, wherein said lower large diameter portion includes a tapered edge at a side of the small diameter portion so that the gasket can readily enter into the lower large diameter portion.

5. A positioning pin adapted to be attached to an engine part for installing a gasket on the engine part, said gasket having a positioning hole engaging the positioning pin and a blocking plate, said positioning pin comprising, a body attached to the engine part and having a projection extending outwardly from the engine part, said projection having a height at least equal to a thickness of the gasket to be installed, and at least one large diameter portion and at least one small diameter portion formed around the projection of the body to be arranged along the longitudinal direction of the body, said large diameter portion having a diameter substantially equal to that of a position setting hole of a plate of the gasket, said small diameter portion, when the gasket is installed on the engine part, being at least located inside the positioning hole of the gasket and the blocking plate being situated under the large diameter portion so that when the gasket is moved on the engine part, the blocking plate of the gasket around the positioning hole is blocked by the large diameter portion to prevent accidental disengagement of the gasket from the engine part.

6. A positioning pin according to claim 5, wherein said body includes a tapered edge at an upper portion thereof to facilitate engagement of the positioning hole of the gasket with the positioning pin.

7. A positioning pin according to claim 5, wherein said upper large diameter portion extends outwardly beyond the gasket for setting a position of an engine part situated above the gasket.

* * * * *